United States Patent
Chung et al.

(10) Patent No.: US 12,019,500 B2
(45) Date of Patent: Jun. 25, 2024

(54) INTEGRATED CIRCUIT PERFORMING DYNAMIC VOLTAGE AND FREQUENCY SCALING OPERATION AND OPERATING METHOD FOR SAME

(71) Applicant: SAMSUNG ELECTRONICS CO., LTD., Suwon-si (KR)

(72) Inventors: Sungwoo Chung, Seoul (KR); Seunghun Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 32 days.

(21) Appl. No.: 17/839,402

(22) Filed: Jun. 13, 2022

(65) Prior Publication Data
US 2022/0413594 A1    Dec. 29, 2022

(30) Foreign Application Priority Data
Jun. 24, 2021 (KR) .................. 10-2021-0082333

(51) Int. Cl.
*G06F 1/3296* (2019.01)
*G06F 1/20* (2006.01)
(Continued)

(52) U.S. Cl.
CPC .......... *G06F 1/3296* (2013.01); *G06F 1/3228* (2013.01); *G06F 1/324* (2013.01);
(Continued)

(58) Field of Classification Search
CPC ........ G06F 1/206; G06F 1/3228; G06F 1/324; G06F 1/329; G06F 1/3296; G06F 9/30083; G06F 9/3836; Y02D 10/00
See application file for complete search history.

(56) References Cited

U.S. PATENT DOCUMENTS

| 8,786,449 | B1  | 7/2014 | Kraipak et al. |
| 9,588,915 | B2* | 3/2017 | Yu .......................... G06F 13/24 |

(Continued)

FOREIGN PATENT DOCUMENTS

| KR | 10-1666549 | 10/2016 |
| KR | 10-1755817 | 7/2017 |

(Continued)

OTHER PUBLICATIONS

"Optimizing Performance with Intel Advanced Vector Extensions," White Paper Intel Advanced Vector Extensions Processor Performance, Sep. 2014.
(Continued)

*Primary Examiner* — Terrell S Johnson
(74) *Attorney, Agent, or Firm* — Fish & Richardson P.C.

(57) ABSTRACT

An integrated circuit includes; a core configured to process an instruction in accordance with a voltage-frequency level, an instruction complexity calculation circuit configured to calculate an instruction complexity for at least one instruction to-be-processed after a reference time in relation to heating information related to the core acquired before the reference time, wherein the instruction complexity calculation circuit is further configured to generate a control signal corresponding to the instruction complexity, and a dynamic voltage and frequency scaling (DVFS) controller configured to adjust the voltage-frequency level after the reference time in response to the control signal.

19 Claims, 8 Drawing Sheets

(51) Int. Cl.
  *G06F 1/3228* (2019.01)
  *G06F 1/324* (2019.01)
  *G06F 1/329* (2019.01)
  *G06F 9/30* (2018.01)
  *G06F 9/38* (2018.01)
  *G06F 9/48* (2006.01)

(52) U.S. Cl.
  CPC .......... *G06F 1/329* (2013.01); *G06F 9/30083* (2013.01); *G06F 9/3836* (2013.01); *G06F 9/4893* (2013.01); *G06F 1/206* (2013.01); *Y02D 10/00* (2018.01)

(56) References Cited

U.S. PATENT DOCUMENTS

| | | | |
|---|---|---|---|
| 9,791,904 B2 | 10/2017 | Rosenzweig et al. | |
| 9,857,978 B1 | 1/2018 | Griffin | |
| 10,025,522 B2 | 7/2018 | Helmick | |
| 10,474,209 B2 * | 11/2019 | Park | G06F 1/206 |
| 10,642,500 B2 | 5/2020 | Benisty | |
| 10,740,361 B2 | 8/2020 | Zhang et al. | |
| 2015/0220097 A1 * | 8/2015 | Kwong | G06F 1/206 |
| | | | 700/291 |
| 2020/0409441 A1 | 12/2020 | Hatch et al. | |
| 2021/0081016 A1 | 3/2021 | Hovis et al. | |

FOREIGN PATENT DOCUMENTS

| | | |
|---|---|---|
| KR | 10-2123178 | 6/2020 |
| KR | 10-2167747 | 10/2021 |

OTHER PUBLICATIONS

Sarabjeet Singh et al., "Memory Centric Characterization and Analysis of Spec CPU2017 Suite", Session 11: Performance Analysis and Simulation, ICPE '19, Apr. 7-11, 2019, Mumbai, India, pp. 285-292.

* cited by examiner

| COMPLEXITY C | CTRL_DVFS |
|---|---|
| $C1 \leq c < C2$ | CTRL1 |
| $C2 \leq c < C3$ | CTRL2 |
| ⋮ | ⋮ |

FIG. 6

|  | FREQUENCY | VOLTAGE |
|---|---|---|
| CTRL1 → | f1 | v1 |
| CTRL2 → | f2 | v2 |
|  | ⋮ | ⋮ |

INTEGRATED CIRCUIT PERFORMING DYNAMIC VOLTAGE AND FREQUENCY SCALING OPERATION AND OPERATING METHOD FOR SAME

CROSS-REFERENCE TO RELATED APPLICATION

This application claims priority under 35 U.S.C. § 119 to Korean Patent Application No. 10-2021-0082333 filed on Jun. 24, 2021 in the Korean Intellectual Property Office, the subject matter of which is hereby incorporated by reference in its entirety.

BACKGROUND

The inventive concept relates generally to integrated circuits (ICs), and more particularly, to ICs capable of performing a dynamic voltage and frequency scaling (DVFS) operation considering complexity of an instruction. The inventive concept also relates to operating methods for such ICs.

As ICs become more densely integrated, the potentially adverse influence of heat generated by the ICs on the performance of the ICs should be carefully considered. Therefore, dynamic thermal management approaches have emerged as possible solution(s) to the management of temperature in ICs. Within the context of certain dynamic thermal management approaches, various DVFS operations may be performed to adjusting a magnitude of a source voltage applied to an IC and/or to adjust a frequency of a clock signal associated with the IC.

SUMMARY

Embodiments of the inventive concept provide ICs capable of performing a DVFS operation in relation to complexity of an instruction to-be-processed in order to optimize performance of the DVFS operation that appropriately adjusts a voltage-frequency level as the complexity of the instruction increases. In this manner, ICs and related operating methods consistent with embodiments of the inventive concept provide improved temperature management performance.

According to an aspect of the inventive concept, an integrated circuit may include; a core configured to process an instruction in accordance with a first voltage-frequency level, an instruction complexity calculation circuit configured to calculate an instruction complexity for at least one instruction to-be-processed after a reference time in relation to heating information acquired before the reference time, wherein the instruction complexity calculation circuit is further configured to generate a control signal corresponding to the instruction complexity, and a dynamic voltage and frequency scaling (DVFS) controller configured to adjust the first voltage-frequency level after the reference time in response to the control signal.

According to an aspect of the inventive concept, an operating method for an integrated circuit including a core may include; processing instructions, using the core, in accordance with a first voltage-frequency level during an earlier interval before a reference time, calculating an instruction complexity for at least one instruction to-be-processed by the core during a later interval after the reference time in relation to heating information associated with the integrated circuit and acquired before the reference time, adjusting the first voltage-frequency level to a second voltage-frequency level after the reference time in response to the instruction complexity, and processing the at least one instruction in accordance with the second voltage-frequency level after the reference time.

According to an aspect of the inventive concept, an integrated circuit may include an integrated circuit performing a dynamic voltage and frequency scaling (DVFS) operation, wherein the integrated circuit includes; a core configured to execute first instructions in accordance with a source voltage received by the core and a clock signal received by the core during an earlier interval before a reference time, a temperature management unit configured to measure a temperature of the integrated circuit, an instruction complexity calculation circuit configured to calculate an instruction complexity for at least one second instruction to-be-processed during a later interval after the reference time, wherein the instruction complexity is calculated in relation to a temperature increment of the integrated circuit associated with execution of the first instructions, and the instruction complexity calculation circuit is further configured to generate a control signal corresponding to the instruction complexity, a dynamic voltage and frequency scaling (DVFS) controller configured to generate at least one of a voltage control signal and a frequency control signal in response to the control signal, a power management unit configured to adjust an amplitude of the source voltage in response to the voltage control signal, and a clock management unit configured to adjust a frequency of the clock signal in response to the frequency control signal.

BRIEF DESCRIPTION OF THE DRAWINGS

Embodiments of the inventive concept will be more clearly understood upon consideration of the following detailed description together with the accompanying drawings in which.

DETAILED DESCRIPTION

Throughout the written description and drawings, like reference numbers and labels are used to denote like or similar elements, components and/or method steps.

Figure 1:
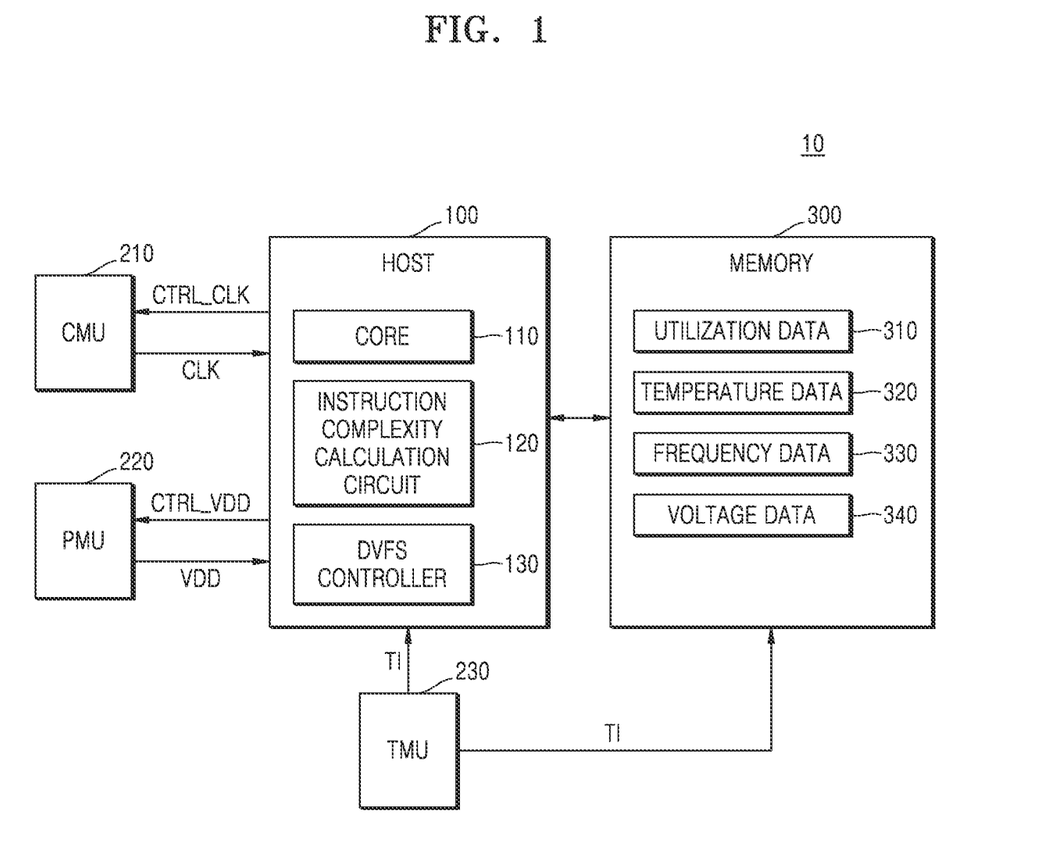
FIG. 1 is a block diagram illustrating an integrated circuit (IC) according to embodiments of the inventive concept.

Figure (FIG. 1 is a block diagram illustrating an integrated circuit (IC) 10 according to embodiments of the inventive concept.

Referring to FIG. 1, the IC 10 includes a host 100, a clock management unit (CMU) 210, a power management unit (PMU) 220, a temperature management unit (TMU) 230, and a memory 300. In some embodiments, at least some of the host 100, the CMU 210, the PMU 220, the TMU 230, and the memory 300 may be included in a semiconductor package. In some embodiments, the host 100, the CMU 210, the PMU 220, the TMU 230, and the memory 300 may be included in a single chip (e.g., a System-on-Chip (SoC)) And in some embodiments, the IC 10 may be an application processor (AP).

The IC 10 may include a system bus (not shown) compatible with one or more data communication protocol(s) defined in relation to one or more technical standard(s), Thus, the system bus may include or interconnect various intelligent properties (IPs) related to the IC 10. Those skilled in the art will appreciate that a variety of protocols and technical standards may be applicable to the definition and/or performance of the system bus. Ready examples of such protocols and technical standards include the advanced microcontroller bus architecture (AMBA) protocol for advanced Reduced Instruction Set Computer (RISC) machine (ARM). In this regard the system bus may conform with standards defining the Advanced High-Performance Bus (AHB), Advanced Peripheral Bus (APB), Advanced eXtensible Interface (AXI), AXI4, and AXI Coherency Extensions (ACE). Alternately or additionally, other protocols such as the SONICs uNetwork, IBM CoreConnect, and Open Core Protocol of OCP-IP may be applied.

The IC 10 may be included as a component or system block associated with a stationary computing system such as desktop Personal Computers (PCs), servers, laptop computers, mobile phones, smartphones, tablet PCs, personal digital assistants (PDAs), enterprise digital assistant (EDAs), digital still cameras, digital video cameras, portable multimedia players (PMPs), personal navigation devices or portable navigation devices (PNDs), handheld game consoles, mobile internet devices (MIDs), wearable computers, Internet of Things (IoT) devices, Internet of Everything (IoE) devices, e-books, etc.

Referring to FIG. 1, the host 100 may control the IC 10, and may be referred to as a host processor, a host device, etc. In some embodiments, the host 100 may include one or more core(s) 110 capable of executing a sequence of instructions associated with one or more applications (or programs). Here, a program may include subprograms, wherein individual subprograms may be referred to as a subroutine, a routine, a procedure, a function, etc. In some embodiments, the host 100 may include at least one IP core and/or a field programmable gate array (FPGA) designed by logic synthesis. Hereinafter, it is assumed that the host 100 includes at least one core 110 that is capable of executing programs, but the scope of the inventive concept is not limited thereto. Hereafter, however, whether the IC 10 physically and/or functionally includes one or more cores, the IC 10 will be described in terms of a "core" 110 for purposes of descriptive clarity.

The CMU 210 may be used to generate a clock signal CLK and adjust a frequency of the clock signal CLK in response to a clock control signal CTRL_CLK. For example, the CMU 210 may include an oscillator generating the clock signal CLK in response to the clock control signal CTRL_CLK. Here, the CMU 210 may be referred to as a clock generator or a clock generating circuit.

The PMU 220 may be used to generate a source voltage VDD and adjust an amplitude of the source voltage VDD in response to a voltage control signal CTRL_VDD. For example, the PMU 220 may include a switching regulator generating the source voltage VDD from a voltage provided from an external power source in response to the voltage control signal CTRL_VDD. Here, the PMU 220 may be referred to as a power management integrated circuit (PMIC).

For convenience of description, a frequency of the clock signal CLK may be referred to as an "operating frequency," and the amplitude of the source voltage VDD may be referred to as an "operating voltage."

The TMU 230 may be used to detect the temperature of the IC 10 and provide corresponding temperature information (TI) to the host 100 and/or the memory 300 at defined intervals. Thus, the memory 300 may store temperature data 320 over a historical period of predetermined length. In this regard, one or more temperature(s) associated with the IC 10 may be reflected in the temperature data 320. These temperatures may be variously determined and may include an internal temperature of the IC 10 and/or an external (e.g., a surface or package) temperature of the IC 10. In some embodiments, the TMU 230 may include a thermistor and/or a temperature sensor.

The memory 300 may be variously accessed by the host 100, such that the host 100 is able to store (or write) data, retrieve (or read) data, erase data and perform a variety of house-keeping operations. The memory 300 may include one or more volatile memory device(s) such as static random access memory (RAM) (SRAM) and/or dynamic RAM (DRAM). Alternately or additionally, the memory 300 may include one or more nonvolatile memory device(s) such as flash memory, a resistive RAM (RRAM), etc. In addition to the temperature data 320 provided by the TMU 230, the memory 300 may also be used to store utilization data 310, operating frequency data 330, and/or operating voltage data 340 provided (e.g., by the host 100. The utilization data 310 may be variously related to one or more utilization rate(s) for the IC 10. In this regard, the term "utilization rate" may refer to a ratio of a cycle count of the clock signal CLK provided when the host 100 is active in relation to a total cycle count of the clock signal CLK provided to the host 100. Hereafter, any one of, or any combination of the utilization data 310, the temperature data 320, the operating frequency data 330, and/or operating voltage data 340 may be referred to as "heating information."

In addition to the core 110, the host 100 may include an instruction complexity calculation circuit 120 and a DVFS controller 130. When the temperature of the IC 10 exceeds a reference temperature, the instruction complexity calculation circuit 120 may generate one or more control signal(s) (CTRL) used to adjust an operating voltage level and/or an operating frequency level (hereafter, "voltage-frequency level") and provide the control signal to the DVFS controller 130.

In its operation, the instruction complexity calculation circuit 120 may estimate (or predict) the relative complexity of instruction(s) to be processed in relation to a reference time (hereafter, a "reference time"), and further in relation to heating information stored in the memory 300 before the reference time. Thereafter, the derived complexity of instruction(s) may be used to generate a control signal provided to the DVFS controller 130 in order to adjust the voltage-frequency level after the reference time Hereafter, the complexity of instruction(s) may be referred to as an "instruction complexity."

In some embodiments, the instruction complexity calculation circuit 120 may calculate a temperature increment for the IC 10 over an "earlier interval" of time (e.g., a first earlier interval) before the reference time, and may predict instruction complexity after the reference time in response to the temperature increment. For example, if instruction complexity is relatively high, a relatively large number of arithmetic logic circuits (ALUs) will be activated in the core 110 in order to execute corresponding instruction(s). Therefore, one or more temperature(s) associated with the IC 10 may rise relatively rapidly, thereby generating a relatively large temperature increment for the IC 10. However, if the instruction complexity is relatively low, a relatively small number of ALUs will be activated in the core 110 to execute the corresponding instruction(s). Therefore, one or more temperature(s) associated with the IC 10 may rise relatively slowly, thereby generating a relatively small temperature increment. That is, when a temperature increment associated with the earlier interval occurring before the reference time is large, instruction complexity (related to instruction(s) to-be-executed after the reference time) will be predicted as relatively high. However, when the temperature increment associated with the earlier interval before the reference time is small, the instruction complexity for instruction(s) to-be-executed after the reference time may be predicted as relatively low.

In this regard, as examples, a first instruction indicating a vector operation may have a relatively high complexity; a second instruction indicating a scalar operation may have a relatively low complexity; a third instruction indicating an operation on a relatively large number (e.g., 32 bits) may have a relatively high complexity; and a fourth instruction indicating an operation on a relatively small number (e.g., 16 bits) may have a relatively low complexity.

In some embodiments, the "reference time" may be a time at which a temperature associated with the host 100 exceeds a corresponding reference temperature.

In some embodiments, the instruction complexity calculation circuit 120 may predict instruction complexity after the reference time in relation to a utilization increment for the host 100 over an earlier interval of time (e.g., a second earlier interval) before the reference time. In this regard, the second earlier interval may be the same as, be different from, overlap or not overlap the first earlier interval.

Thus, when instruction complexity is relatively high, a time interval during which the core 110 is activated in order to execute the corresponding instruction(s) may increase, thereby generating a relatively large utilization increment. However, when the instruction complexity is relatively low, a time interval during which the core 110 is activated in order to execute the corresponding instruction(s) may remain the same (e.g. be maintained) or be reduced, thereby generating a relatively small utilization increment. Accordingly, when a utilization increment before the reference time is relatively large, instruction complexity after the reference time may be predicted to be relatively high, yet when the utilization increment before the reference time is relatively small, the instruction complexity after the reference time may be predicted to be relatively low.

In some embodiments, the instruction complexity calculation circuit 120 may predict an instruction complexity for a next occurring period of time (or a "later interval" of time) in relation to an operating frequency increment for an earlier interval before the reference time. That is, when instruction complexity is relatively high, an operating frequency may be relatively high in order to efficiently execute the corresponding instruction(s). Thus, when the instruction complexity is relatively low, the operating frequency may be maintained or reduced in order to reduce power consumption. That is, when the operating frequency increment for an earlier interval before the reference time is relatively large, instruction complexity after the reference time may be predicted to be relatively high, yet when the operating frequency increment for the earlier interval before the reference time is relatively small, instruction complexity after the reference time may be expected to be relatively low.

In some embodiments, the instruction complexity calculation circuit 120 may predict instruction complexity after the reference time in response to an operating voltage increment for an earlier interval before the reference time. That is, when instruction complexity is relatively high, an operating voltage may be relatively large in order to efficiently execute the corresponding instruction(s). However, when instruction complexity is relatively low, the operating voltage may be maintained or reduced in order to reduce power consumption. That is, when the operating voltage increment for an earlier interval before the reference time is relatively large, instruction complexity after the reference time may be predicted to be relatively high, yet when the operating voltage increment for an earlier interval before the reference time is relatively small, instruction complexity after the reference time may be expected to be relatively low.

In some embodiments, the instruction complexity calculation circuit 120 may calculate instruction complexity by weighting one or more of a temperature increment, a utilization increment, an operating frequency increment, and/or an operating voltage increment. In some embodiments, a specific weighting value assigned to each of the temperature increment, the utilization increment, the operating frequency increment, and the operating voltage increment may be determined before operation of the IC 10 using (e.g., empirical data, machine learning, etc.

In some embodiments, the instruction complexity calculating circuit 120 may determine instruction type(s) for instructions stored in an instruction register (not shown in FIG. 1) before the reference time, and calculate the instruction complexity in relation to instruction type(s). In some embodiments, a number of complex-type instructions and/or a number of simple-type instructions may be determined (e.g., counted) by the instruction complexity calculating circuit 120 by identifying corresponding operation codes (opcodes) for the instructions stored in the instruction register. It follows that each operation code may be assigned a complexity value or weighting in advance. Accordingly, the instruction complexity calculation circuit 120 may count a number of complex instructions and a number of simple instructions processed during an earlier interval before the reference time, and may thereafter predict instruction complexity after the reference time in response to the counted number of complex instructions and the counted number of simple instructions. In some embodiments, the instruction complexity calculation circuit 120 may calculate instruction complexity for instruction(s) to-be-processed after the reference time using at least one of opcode(s), temperature increment(s), utilization increment(s), operating frequency increment(s), and/or operating voltage increment(s).

The DVFS controller 130 may calculate a utilization rate for the host 100 at defined intervals and store the calculated utilization rate in the memory 300. The DVFS controller 130 may also store a frequency value for the clock signal CLK provided to the core 110 in the memory 300 at defined intervals. The DVFS controller 130 may also store an amplitude value for the source voltage (e.g., VDD) provided to the core 110 in the memory 300 at defined intervals.

The DVFS controller 130 may receive control signal(s) corresponding to instruction complexity information generated by the instruction complexity calculation circuit 120, and generate the clock control signal CTRL_CLK and/or the voltage control signal CTRL_VDD in order to adjust the voltage-frequency level in response to the control signal(s).

The IC 10 of FIG. 1 may predict instruction complexity for instruction(s) to-be-processed after the reference time in response to various heating information acquired before the reference time, and then, adjust the voltage-frequency level in relation to the predicted instruction complexity, thereby improving overall instruction processing performance and/or temperature management performance.

Those skilled in the art will appreciate that the IC 10 f FIG. 1 may include additional and/or otherwise-implemented (e.g., in hardware, firmware and/or software) components. For example, the IC 10 may further include various functional blocks such as input/output (I/O) interface(s), a universal serial bus (USB), a USB slave block, etc.

Figure 2:
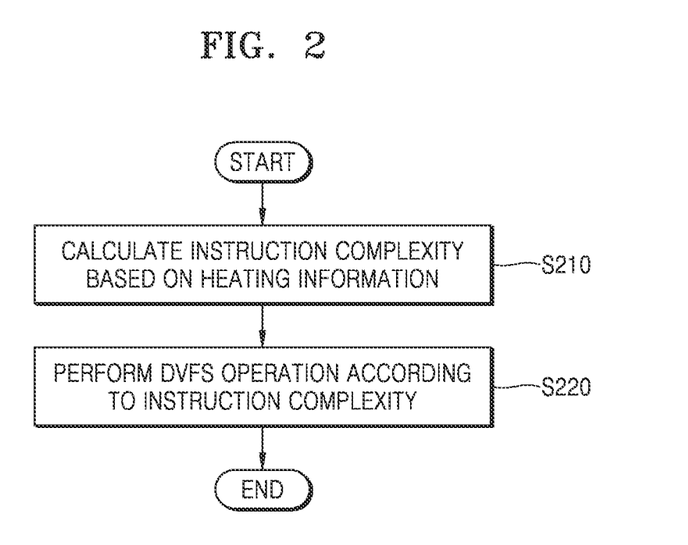
FIG. 2 is a flowchart illustrating an operating method for an IC according to embodiments of the inventive concept.

FIG. 2 is a flowchart illustrating an operating method for an IC according to embodiments of the inventive concept.

Referring to FIG. 2, the operating method may include calculating instruction complexity in response to (or based on) heating information (S210). Here, the instruction complexity calculation circuit 120 may be used to calculate the instruction complexity for instruction(s) to-be-processed after the reference time in relation to various heating information acquired and stored before the reference time. In some embodiments, the instruction complexity calculation circuit 120 may calculate instruction complexity for instruction(s) to be processed after the reference time in response to at least one of: a temperature increment for the IC 10, a utilization increment for the host 100, an operating frequency increment, and an operating voltage increment—each of which having been acquired before the reference time. In this regard, a calculated (or determined) instruction complexity may be classified according to a number of predetermined complexity groups.

The operating method of FIG. 2 may further include performing a DVFS operation in response (or according) to the calculated instruction complexity (S220). That is, the DVFS controller 130 may perform a DVFS operation to adjust the level (or amplitude) of the source voltage (e.g., VDD) and/or adjust the frequency of the clock signal CLK according to the calculated instruction complexity (hereafter singularly or collectively, adjusting the "voltage-frequency level"). In some embodiments, the instruction complexity calculation circuit 120 may generate a DVFS control signal corresponding to a complexity group to which the calculated instruction complexity belongs, and the DVFS controller 130 may perform the DVFS operation controlling the CMU 210 and/or the PMU 220 in response to the DVFS control signal.

Figure 3:
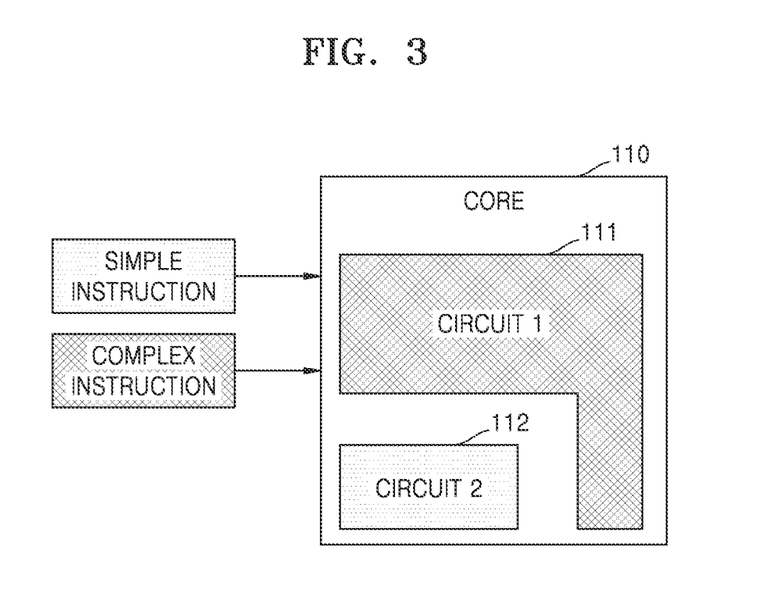
FIG. 3 is a conceptual diagram illustrating temperature increase as a function of instruction complexity.

FIG. 3 is a conceptual diagram illustrating a relationship between instruction complexity for a simple instruction and a complex instruction verses activation of circuitry within the core 110.

Referring to FIGS. 1 and 3, the core 110 may process (or execute) an instruction by fetching a simple instruction or a complex instruction from the memory 300 and executing the fetched instruction.

In this regard, the core 110 may include a first circuit 111 and a second circuit 112 for executing instructions, wherein each of the first circuit 111 and the second circuit 112 may include an arithmetic and logic unit (ALU), an accumulator (AC), an instruction register (IR), and a program counter register (PC), etc. The first circuit 111 may be a circuit used to efficiently execute complex instructions, while the second circuit 112 may be a circuit used to efficiently and conservatively (e.g., relative to electrical power and/or computation time) execute simple instructions. (Here, for conceptual clarity, the first circuit 111 and the second circuit 112 are shown as separate circuitry, but those skilled in the art will appreciate that some portion of the second circuit 112 and first circuit 111 may be commonly implemented or shared).

Not surprisingly, the first circuit 111 may be implemented with a greater number of transistors than the second circuit 112. Accordingly, when the core 110 processes the simple instruction, a smaller number of transistors may be activated, as compared with processing of the complex instruction. Hence, a temperature associated with the IC 10 may rise only by a small amount during processing of the simple instruction. By comparison, when the core 110 processes the complex instruction, a greater number of transistors may be activated, as compared with processing of the simple instruction. Hence, the temperature associated with the IC 10 may rise by a greater amount during processing of the complex instruction.

When the instruction complexity for instruction(s) to-be-processed after the reference time is predicted to be relatively large, the DVFS controller 130 may adjust the voltage-frequency level to a first (relatively lower) voltage-frequency level and the first circuit 111 may be activated in accordance with the first voltage-frequency level. However, when the instruction complexity for instruction(s) to-be-processed after the reference time is predicted to be relatively small, the DVFS controller 130 may adjust the voltage-frequency level to a second (relatively higher) voltage-frequency level and the second circuit 112 may be activated in accordance with the second voltage-frequency level.

Further in this regard, the core 110 may active (i.e., e in an active state) while the instruction(s) are being processed, and thus, the utilization rate of the host 100 may be independently controlled regardless of instruction complexity. However, respective circuits in the core 110 activated in accordance with a particular instruction complexity may be different, and therefore, even if a utilization rate remains stable, a temperature increment for the IC 10 may be carefully controlled (e.g., differently varied) in response instruction complexity.

Figure 4:
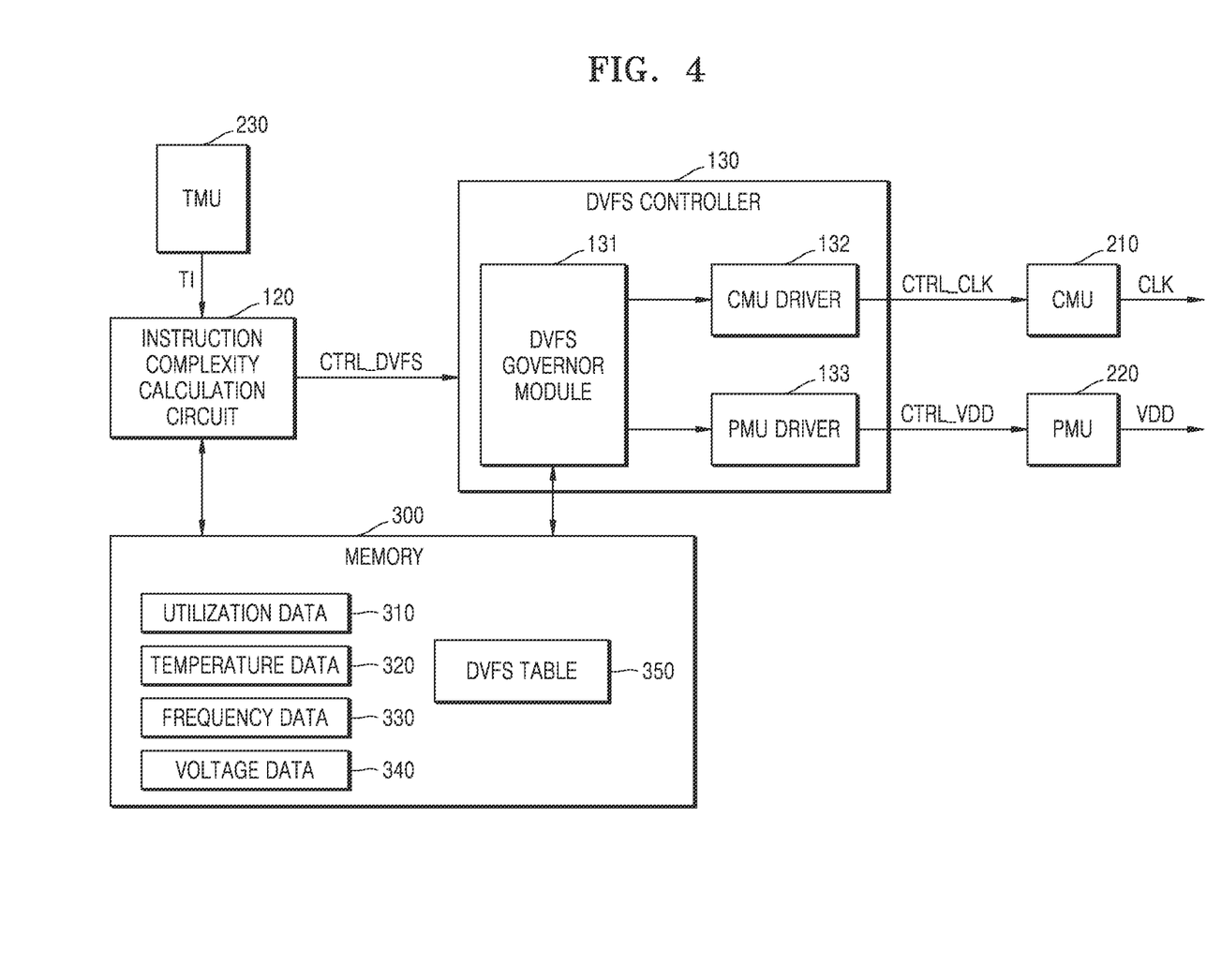
FIG. 4 is a block diagram further illustrating a dynamic voltage and frequency scaling (DVFS) operation performed by the IC of FIG. 1 according to embodiments of the inventive concept.
Figure 5:
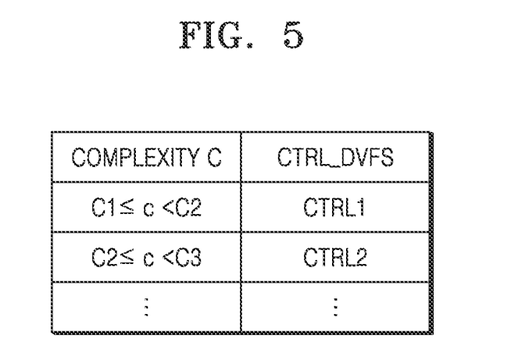
FIG. 5 is a table listing different levels of instruction complexity in relation to DVFS control signal(s) according to embodiments of the inventive concept.
Figure 6:
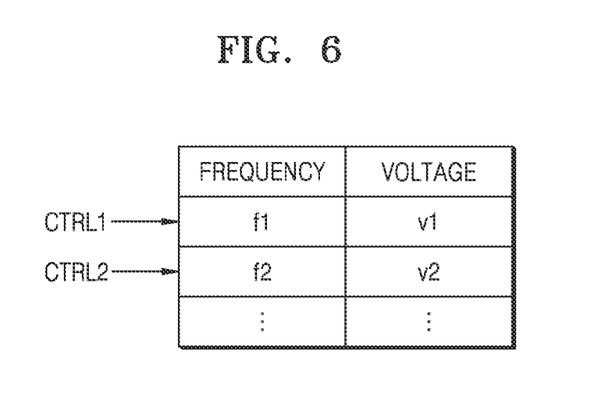
FIG. 6 is a DVFS table listing different frequency-voltage levels as a function of control signals according to embodiments of the inventive concept.

FIG. 4 is a block diagram further illustrating performing of a DVFS operation in the IC 10 of FIG. 1 according to embodiments of the inventive concept. FIG. 5 is a table listing instruction complexity as a function of DVFS control signal, and FIG. 6 is a table listing voltage-frequency level as a function of control signal(s).

Referring to FIGS. 1 and 4, the DVFS controller 130 may include a DVFS governor module 131, a CMU driver 132, and a PMU driver 133. Here, the term "module" may refer to hardware capable of performing functions and operations according to respective names or may refer to computer program code capable of performing certain functions and operations. However, the scope of the inventive concept is not limited to only the illustrated examples and may alternately refer to an electronic recording medium, for example, a processor, in which computer program code capable of performing a certain function and operation is loaded. That is, a module may refer to a functional and/or structural combination of hardware capable of carrying out the technical idea of the inventive concept and/or software for driving the hardware.

The DVFS governor module 131 may be used to control overall DVFS operation. In some embodiments, the DVFS governor module 131 may receive a DVFS control signal CTRL_DVFS from the instruction complexity calculation circuit 120 and control the CMU driver 132 and the PMU driver 133 to adjust a voltage-frequency level in response to the DVFS control signal CTRL_DVFS.

The CMU driver 132 may output the clock control signal CTRL_CLK to the CMU 210 under the control of the DVFS governor module 131. The CMU 210 may provide a clock signal CLK having a frequency adjusted according to the clock control signal CTRL_CLK to the host 100. The PMU driver 133 may output the power control signal CTRL_VDD to the PMU 220 under the control of the DVFS governor module 131. The PMU 220 may provide the source voltage VDD having a magnitude adjusted according to the power control signal CTRL_VDD to the host 100.

The memory 300 may include one or more DVFS table(s) 350 listing (e.g., voltage-frequency levels, wherein the DVFS governor module 131 may control the CMU driver 132 and the PMU driver 133 with reference to the DVFS table(s) 350.

The instruction complexity calculation circuit 120 may receive the temperature information TI provide by the TMU 230 in order to determine whether the temperature of the host 100 exceeds a reference temperature. When the temperature of the host 100 exceeds the reference temperature, the instruction complexity calculation circuit 120 may provide the DVFS control signal CTRL_DVFS to the DVFS controller 130.

In some embodiments, the instruction complexity calculation circuit 120 may calculate tan instruction complexity for instruction(s) to-be-processed after the reference time in relation to various heating information (e.g., utilization data 310, temperature data 320, operating frequency data 330, and/or operating voltage data 340) derived before the reference time and stored in the memory 300.

For example, the instruction complexity calculation circuit 120 may calculate instruction complexity for instruction(s) to-be-processed after the reference time in response to at least one of a temperature increment, a utilization increment, an operating frequency increment, and/or a voltage increment derived before the reference time. The instruction complexity calculation circuit 120 may generate the DVFS control signal CTRL_DVFS corresponding to the calculated instruction complexity, and provide the DVFS control signal CTRL_DVFS to the DVFS controller 130.

In some embodiments, the instruction complexity calculation circuit 120 may calculate instruction complexity for a later interval (e.g., a nest time interval after the reference time) according to Equation 1, below.

$$\text{Complexity} = w1*\Delta\text{Temp} + w2*\Delta\text{util} + w3*\Delta\text{freq} + w4*\Delta\text{vol} \quad \text{Equation 1:}$$

Here, "Complexity" denotes the instruction complexity for instruction(s) to-be-processed after the reference time; values w1, w2, w3 and w4 are respectively-assigned first, second, third and fourth (hereafter collectively, "first to fourth") weightings, "$\Delta$temp" is the temperature increment, "$\Delta$util" is the utilization increment, "$\Delta$freq" is the operating frequency increment, and "$\Delta$vol" is the operating voltage increment In some embodiments, the first to fourth weightings may have respective value(s) predetermined using empirical data, machine learning, etc. derived (e.g., from examined relationships associated with variously instruction complexities, the temperature increment, the utilization increment, the frequency increment, and/or the voltage increment. However, the scope of the inventive concept is not limited to only the expression of Equation 1 and those skilled in the art will appreciate that other modeling equations may be used.

However, in some embodiments, the instruction complexity calculation circuit 120 may use at least one of the temperature increment, the utilization increment, the operating frequency increment, and the operating voltage increment to calculate instruction complexity. In other embodiments, instruction complexity may additionally or alternately calculated according to operation codes for instructions processed before the reference time.

Referring to FIG. 5, the instruction complexity calculation circuit 120 may determine a first complexity range ($C1 \leq c \leq C2$) (e.g., for a first complexity group) for calculated instruction complexity 'c', and generate the DVFS control signal CTRL_DVFS corresponding to the first complexity range; and the instruction complexity calculation circuit 120 may determine a relatively greater second complexity range ($C2 \leq c \leq C3$) (e.g., for a second complexity group) for calculated instruction complexity 'c', and generate the DVFS control signal CTRL_DVFS corresponding to the second complexity range, etc., —for each one of a desired number of complexity groups. The instruction complexity calculation circuit 120 may also assign a DVFS control signal CTRL_DVFS (e.g., a first control signal CTRL1, a second control signal CTRL2, etc.) for one or more of the determined complexity ranges (or complexity groups).

Referring to FIG. 6, the DVFS controller 130 may then adjust the voltage-frequency level in response to a DVFS control signal CTRL_DVFS reference in the DVFS table(s) 350. For example, the DVFS controller 130 may adjust the operating frequency to a first frequency f1 and adjust the operating voltage to a first voltage v1 in response to the first DVFS control signal CTR1, or adjust the operating frequency to a second frequency f2 and adjust the operating voltage to a second voltage v2 in response to the second DVFS control signal CTRL2.

In this manner, as one example, the DVFS controller 130 may adjust the voltage-frequency level to optimize execution of instruction(s) to-be-processed by performing the DVFS operation in accordance with instruction complexity for instruction(s) to-be-processed after the reference time. In addition, the DVFS controller 130 may predict instruction complexity in relation to a temperature of the host 100 and perform the DVFS operation in accordance with the predicted instruction complexity, thereby providing improved temperature management performance.

Figure 7:
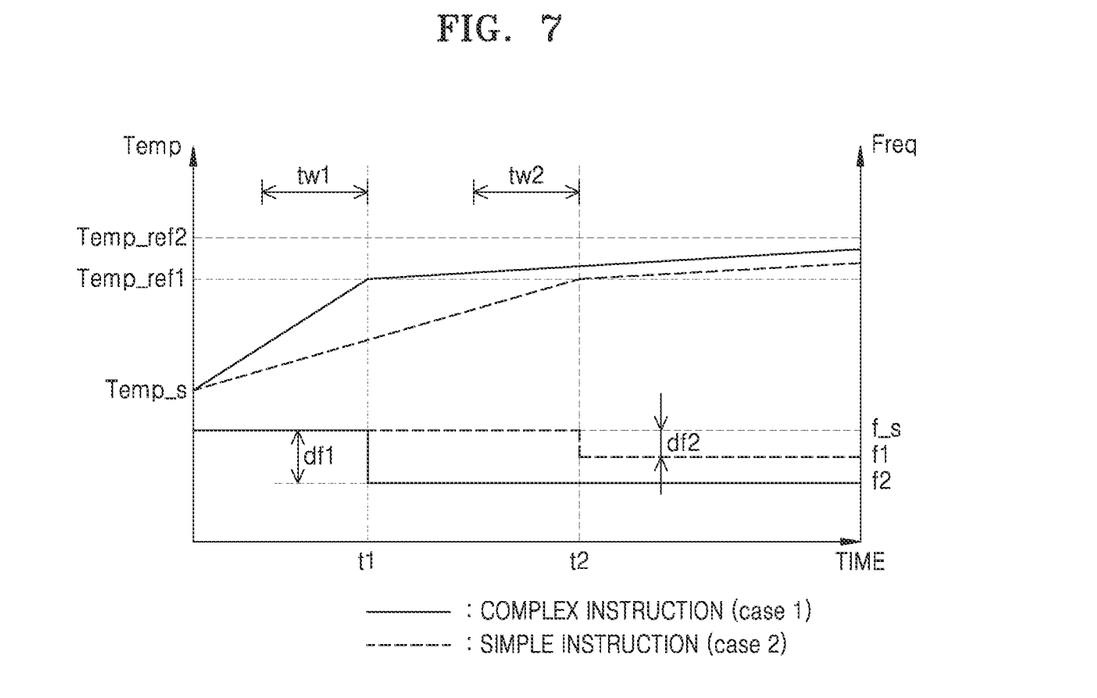
FIG. 7 is a time-temperature graph illustrating DVFS operation in relation to a simple instruction and a complex instruction according to embodiments of the inventive concept.

FIG. 7 is a time-temperature graph further illustrating DVFS operation according to embodiments of the inventive concept. Here, FIG. 7 illustrates DVFS operation for a first case (case 1) wherein a complex instruction is executed, and a second case (case 2) wherein a simple instruction is executed.

Referring to FIGS. 1, 2, 3, 4, 5, 6, and 7, as the host 100 executes instructions fetched from the memory 300, the temperature of the host 100 may gradually increase from a start temperature (Temp_s). Here, it is further assumed that the operating frequency begins at a start frequency (f_s), wherein the DVFS controller 130 may periodically calculate a utilization rate for the host 100 and store the calculated utilization rate in the memory 300. Further, the operating frequency and the operating voltage—as controlled by operation of the DVFS controller 130—may be periodically stored in the memory 300. Further, the TMU 230 may periodically measure temperature for the host 100 and store the measured temperature in the memory 300.

In the first case (case 1), the temperature of the host 100 rapidly reaches a first reference temperature (Temp_ref1) at time t1 (e.g., the reference time). Accordingly, the instruction complexity calculation circuit 120 may calculate instruction complexity for instruction(s) to-be-processed after t1 in relation to heating information stored in the memory 300 during a first earlier interval (tw1) before the t1. In some embodiments, the instruction complexity may be calculated in accordance with Equation 1.

The instruction complexity calculation circuit 120 may accordingly generate (or select) a DVFS control signal CTRL_DVFS corresponding to the calculated instruction complexity, or according to an instruction complexity group in which the calculated instruction complexity falls. For example, referring to the table of FIG. 5, it is assumed that the instruction complexity calculation circuit 120 initially selects the second DVFS control signal CTRL2 in relation to the calculated instruction complexity.

Then at time t2 and referring to FIG. 6, the DVFS controller 130 may perform a DVFS operation in response to the second DVFS control signal CTRL2, wherein the operating frequency is changed (e.g., by a first frequency difference df1) to the second frequency f2, lower than a start frequency f_s.

However, in the second case (case 2) by way of comparison with the first case (case 1), the temperature of the host 100 more slowly reaches the first reference temperature Temp_ref1 at time t2. The instruction complexity calculation circuit 120 may calculate an instruction complexity for instruction(s) to-be-processed after time t2 in response to the heating information stored in the memory 300 during a second earlier period (tw2) before the second time t2. Again, in some embodiments, the instruction complexity may be calculated in accordance with Equation 1.

The instruction complexity calculation circuit 120 may then generate the DVFS control signal CTRL_DVFS corresponding to the calculated instruction complexity. For example, referring to FIG. 5, the instruction complexity calculation circuit 120 may generate the first DVFS control signal CTRL1, and referring to FIG. 6, the DVFS controller 130 may perform a DVFS operation in response to a first DVFS control signal CTRL1 to change (e.g., by a second frequency difference df2) the operating frequency to the first frequency f1 lower than the start frequency f_s, and, wherein the first frequency difference df1 may be greater than the second frequency difference df2.

In some embodiments, even if the DVFS operation is performed in response to the instruction complexity, the temperature of the IC 10 may not decrease below the first reference temperature Temp_ref1. That is, the voltage-frequency level may be further reduced in relation to instruction complexity, yet the performance of the IC 10 may be maintained at a substantially constant level.

Accordingly, when the temperature of the IC 10 exceeds a second reference temperature Temp_ref2, the DVFS controller 130 may perform the DVFS operation so that the temperature of the IC 10 is reduced below the second reference temperature Temp_ref2. Here, the second reference temperature Temp_ref2 may be a defined limit temperature at which performance of the IC 10 begins to markedly deteriorate.

Thus, in an integrated circuit according to embodiments of the inventive concept, an instruction complexity calculation circuit may be configured to provide a first control signal to the DVFS controller, if a calculated instruction complexity fall in a first complexity range. Accordingly, and the DVFS controller may be further configured to adjust the voltage-frequency level to a first voltage-frequency level in response to the first control signal. The instruction complexity calculation circuit may be further configured to provide a second control signal to the DVFS controller, if the instruction complexity fall in a second complexity range. Accordingly, the DVFS controller may be further configured to adjust the voltage-frequency level to a second voltage-frequency level in response to the second control signal.

Here, the first complexity range may be "greater than" (e.g., be related to a relatively more complex instruction complexity) than the second complexity range (e.g., be related to a relatively less complex, instruction complexity). Further, the first voltage-frequency level may be "lower than" the second voltage-frequency level in the context that a voltage amplitude level and/or an operating frequency level may be higher in the second voltage-frequency.

Figure 8:
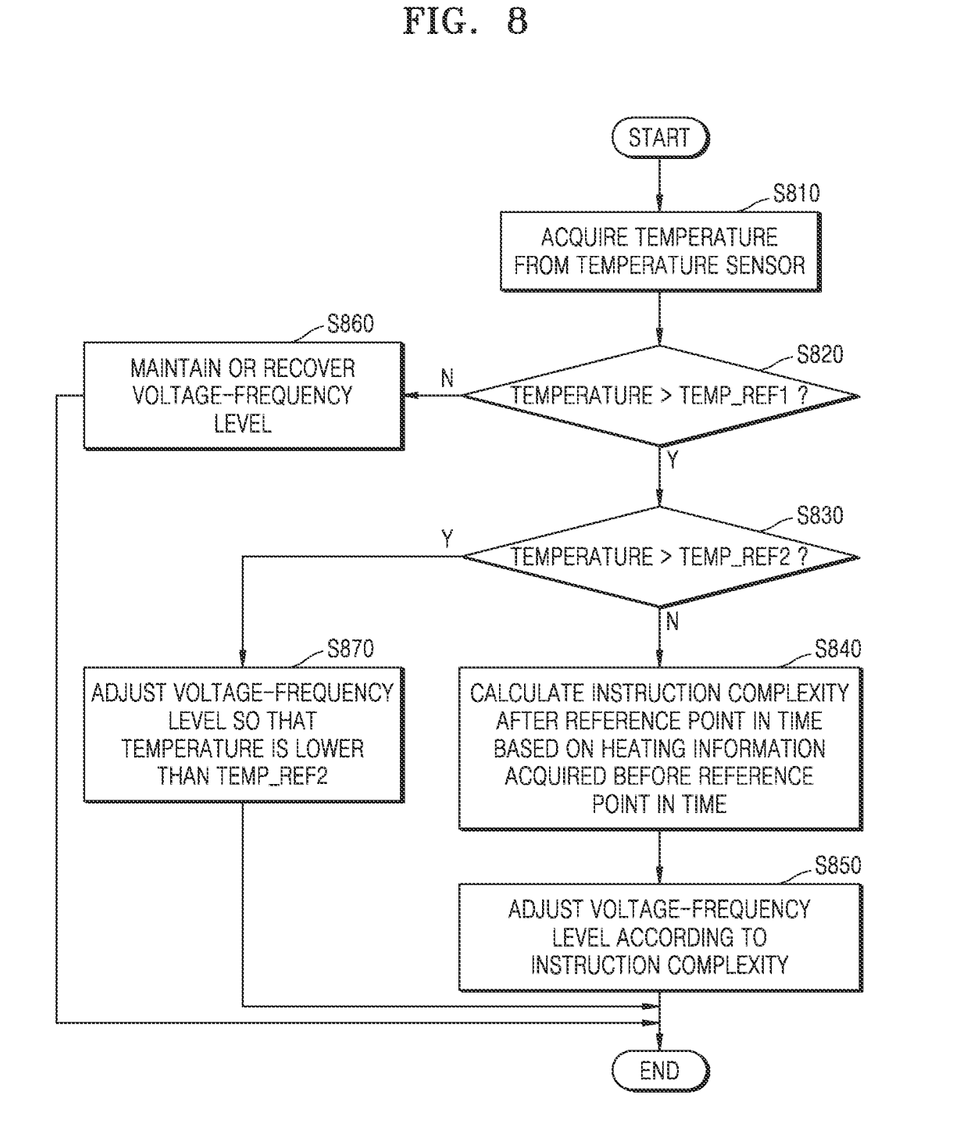
FIG. 8 is a flowchart illustrating an operating method for an IC according to embodiments of the inventive concept.

FIG. 8 is a flowchart illustrating an operating method for an IC according to embodiments of the inventive concept.

Referring to FIG. 8, the instruction complexity calculation circuit 120 may acquire temperature information of the IC 10 from a temperature sensor or the TMU 230 (S810). Then, the instruction complexity calculation circuit 120 may determine whether the temperature of the IC 10 exceeds the first reference temperature temp_ref1 (S820). In some embodiments, the method step S820 may be performed by the TMU 230.

If the temperature exceeds the first reference temperature temp_ref1 (S820=YES), the instruction complexity calculation circuit 120 may determine whether the temperature of the IC 10 also exceeds the second reference temperature temp_ref2 (S830). In some embodiments, the method step S830 may also be performed by the TMU 230. However, if the temperature does not exceeds the first reference temperature temp_ref1 (S820=NO), the DVFS controller 130 may maintain the current voltage-frequency level or recover a previous voltage-frequency level (S860). (Here, in some embodiments, when method step S860 is performed after previously performing method step S850, the DVFS controller 130 may need recover a previously used voltage-frequency level that has been stored (e.g., in the memory).

If the temperature exceeds the second reference temperature temp_ref2 (S830=YES), the DVFS controller 130 may adjust the voltage-frequency level so that the temperature of the IC 10 is reduced below the second reference temperature temp_ref2 (S870). However, if the temperature does not exceed the second reference temperature temp_ref2 (S830=NO), the instruction complexity calculation circuit 120 may calculate instruction complexity after the reference time in response to heating information acquired before the reference time (S840).

Here, the reference time may be a point in time at which the temperature of the IC 10 exceeds the first reference temperature temp_ref1. And the instruction complexity calculation circuit 120 may calculate instruction complexity in response to at least one of a temperature increment, a utilization increment, an operating frequency increment, and an operating voltage increment for an earlier interval before the reference time.

Upon completing S840, the DVFS controller 130 may adjust the voltage-frequency level in accordance with the calculated instruction complexity (S850). In some embodiments, the instruction complexity calculation circuit 120 may provide the DVFS control signal corresponding to the calculated instruction complexity to the DVFS controller 130, and the DVFS controller 130 may adjust the voltage-frequency level in response to the DVFS control signal.

Referring to method step S870, the DVFS controller 130 may adjust the voltage-frequency level so that the temperature of the IC 10 is less than the second reference temperature temp_ref2. That is, when the temperature of the IC may be greater than the first reference temperature temp_ref1 and less than or equal to the second reference temperature temp_ref2. Further, the temperature of the IC 10 may rise even if the voltage-frequency level is adjusted in method step S850. However, when the temperature of the IC 10 is higher than the second reference temperature temp_ref2, the temperature of the IC 10 will be reduced by execution of method step S870.

Figure 9:
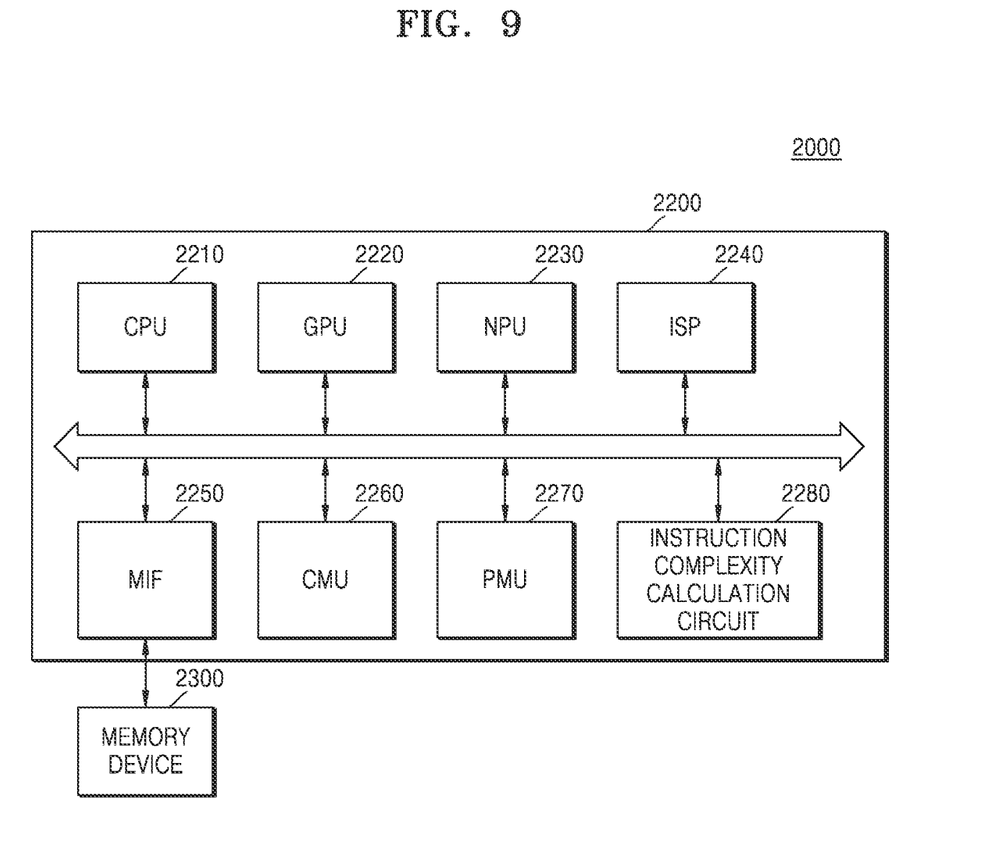
FIG. 9 is a block diagram illustrating a system according to embodiments of the inventive concept.

FIG. 9 is a block diagram illustrating a system 2000 according to embodiments of the inventive concept. Referring to FIG. 9, the system 2000 may be implemented as a mobile phone, a smartphone, a tablet computer, a PDA, an EDA, a digital still camera, a digital video camera, a PMP, a PDN, a handheld game console, or a handheld device that may be carried in hand such as an e-book.

The system 2000 may include an SoC 2200 and a memory device 2300. The SoC 2200 may include a central processing unit (CPU) 2210, a graphics processing unit (GPU) 2220, a neural processing unit (NPU) 2230, an image signal processor (ISP) 2240, a memory interface (MIF) 2250, a CMU 2260, and a PMU 2270. The CPU 2210, GPU 2220, NPU 2230, and ISP 2240 may be referred to as a master IP device, and the MIF 2250 may be referred to as a slave IP device. At least one of the CPU 2210, the GPU 2220, the NPU 2230, and the ISP 2240 may be an implementation example of the host described above with reference to FIGS. 1 to 8. Accordingly, at least one of the CPU 2210, the GPU 2220, the NPU 2230, and the ISP 2240 may include a DVFS controller performing a DVFS operation. A DVFS controller included in the CPU 2210, the GPU 2220, the NPU 2230 or the ISP 2240 may control the CMU 2260 or the PMU 2270, and the CPU 2210, the GPU 2220, the NPU 2230, and the ISP 2240 may receive the clock signal CLK from the CMU 2260 and receive the source voltage from the PMU 2270, thereby processing the instruction.

The CPU 2210 may process or execute instructions and/or data stored in the memory device 2300 in response to the clock signal generated by the CMU 2260.

The GPU 2220 may acquire image data stored in the memory device 2300 in response to the clock signal generated by the CMU 2260. The GPU 2220 may generate data for an image output through a display device (not shown) from image data provided from the MIF 2250, or may encode the image data.

The NPU 2230 may refer to a certain device executing a machine learning model. The NPU 2230 may be a hardware block designed to execute the machine learning model. The machine learning model may be a model in response to an artificial neural network, a decision tree, a support vector machine, a regression analysis, a Bayesian network, a genetic algorithm, or the like. The artificial neural network may include, as non-limiting examples, a convolution neural network (CNN), a region with convolution neural network (R-CNN), a region proposal network (RPN), a recurrent neural network (RNN), a stacking-based deep neural (S-DNN), a state-space dynamic neural network (S-SDNN), a deconvolution network, a deep belief network (DBN), a restricted Boltzmann machine (RBM), a fully convolutional network, a long short-term memory (LSTM) network, and a classification network.

The ISP 2240 may perform a signal processing operation on raw data received from the image sensor (not shown) located outside the SoC 2200 and generate digital data having improved image quality.

The MIF 2250 may provide an interface for the memory device 2300 located outside the SoC 2200. The memory device 2300 may be DRAM, phase-change random access memory (PRAM), resistive random access memory (ReRAM), or flash memory.

The CMU 2260 may generate a clock signal and provide the clock signal to components of the SoC 2200. The CMU 2260 may include a clock generator such as a phase locked loop (PLL), a delayed locked loop (DLL), and a crystal. The PMU 2270 may convert external power into internal power and supply power to the components of the SoC 2200 using the internal power.

The instruction complexity calculation circuit 2280 may calculate instruction complexity for instructions to-be-processed by the CPU 2210, the GPU 2220, the NPU 2230, or the ISP 2240 in response to heating information on the CPU 2210, the GPU 2220, the NPU 2230, or the ISP 2240 acquired before the reference point in time. The DVFS controller included in at least one of the CPU 2210, the GPU 2220, the NPU 2230, and the ISP 2240 may receive the DVFS control signal from the instruction complexity calculation circuit 2280, and adjust an operating frequency or operating voltage provided to the CPU 2210, the GPU 2220, the NPU 2230, or the ISP 2240.

Figure 10:
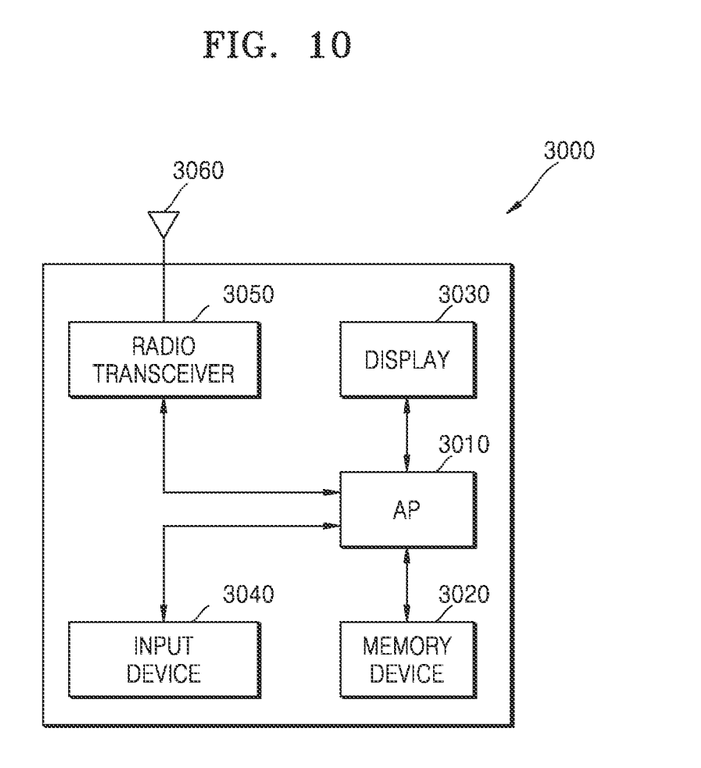
FIG. 10 is a block diagram illustrating a communication device including an application processor (AP) according to embodiments of the inventive concept.

FIG. 10 is a block diagram illustrating a communication device 3000 including an AP 3010 according to embodiments of the inventive concept.

Referring to FIG. 10, the communication device 3000 may include the AP 3010, a memory device 3020, a display 3030, an input device 3040, and a radio transceiver 3050. The AP 3010 may be an implementation example of the IC 10 described above with reference to FIGS. 1, 2, 3, 4, 5, 6, 7, and 8.

The radio transceiver 3050 may transmit or receive a wireless signal through an antenna 3060. For example, the radio transceiver 3050 may change a wireless signal received through the antenna 3060 into a signal that may be processed by the AP 3010.

Accordingly, the AP 3010 may process a signal output from the radio transceiver 3050 and transmit the processed signal to the display 3030. Also, the radio transceiver 3250 may change the signal output from the AP 3010 into a wireless signal and output the changed result to an external device through the antenna 3060.

The input device 3040 is a device for inputting a control signal for controlling an operation of the AP 3010 or data to be processed by the AP 3010, and may be implemented as a pointing device such as a touch pad and a computer mouse, a keypad, or a keyboard.

According to an embodiment, the AP 3010 may include the instruction complexity calculation circuit 120 and the DVFS controller 130. As described above with reference to FIGS. 1 to 8, when the temperature of the AP 3010 exceeds the reference temperature, the instruction complexity calculation circuit 120 may calculate the instruction complexity for instructions to be processed after a certain period of time in response to the heating information acquired during the certain period of time. The DVFS controller 130 may adjust the voltage-frequency level in response to the complexity of the instructions.

Although not shown in FIG. 10, the communication device 3000 may further include a CMU providing a clock signal and a PMU providing a power voltage to various components included in the communication device 3000. The CMU may output a clock signal having a frequency adjusted under the control of the DVFS controller 130, and the PMU may output a source voltage having an amplitude adjusted under the control of the DVFS controller.

While the inventive concept has been particularly shown and described with reference to embodiments thereof, it will be understood that various changes in form and details may be made therein without departing from the spirit and scope of the following claims.

What is claimed is:

1. An integrated circuit comprising:
    a core configured to process an instruction in accordance with a first voltage-frequency level;
    an instruction complexity calculation circuit configured to calculate an instruction complexity for at least one instruction to-be-processed after a reference time in relation to heating information acquired before the reference time, wherein the instruction complexity calculation circuit is further configured to generate a control signal corresponding to the instruction complexity; and
    a dynamic voltage and frequency scaling (DVFS) controller configured to adjust the first voltage-frequency level after the reference time in response to the control signal,
    wherein, to calculate the instruction complexity, the instruction complexity calculation circuit is configured to
        identify at least one operation code corresponding to the at least one instruction,
        count, from the at least one operation code, a first number of operation codes associated with a first complexity value and a second number of operation codes associated with a second complexity value, and
        determine the instruction complexity based on the first number and the second number.

2. The integrated circuit of claim 1, wherein the heating information includes at least one of a temperature increment, a utilization increment, an operating frequency increment, and an operating voltage increment, and
    the at least one of the temperature increment, the utilization increment, the operating frequency increment, and the operating voltage increment is determined before the reference time.

3. The integrated circuit of claim 2, wherein the instruction complexity calculation circuit is further configured to calculate the instruction complexity by summing a first product of the temperature increment and a first weight, a second product of the utilization increment and a second weight, a third product of the operating frequency increment and a third weight, and a fourth product of the operating voltage increment and a fourth weight, and
    at least one of the first weight, the second weight, the third weight and the fourth weight is determined using machine learning.

4. The integrated circuit of claim 1, wherein the instruction complexity calculation circuit is further configured to provide a first control signal to the DVFS controller if the instruction complexity falls within a first complexity range, and
    the DVFS controller is further configured to adjust the first voltage-frequency level to a second voltage-frequency level in response to the first control signal.

5. The integrated circuit of claim 4, wherein the first complexity range is greater than the second complexity range, and the first voltage-frequency level is lower than the second voltage-frequency level.

6. The integrated circuit of claim 5, wherein the core includes:
    a first circuit configured to process a simple instruction in accordance using the first voltage-frequency level; and
    a second circuit configured to process a complex instruction in accordance with the second voltage-frequency level,
    wherein the first circuit includes a greater number of transistors than the second circuit.

7. The integrated circuit of claim 1, further comprising:
    a memory configured to store a DVFS table including a plurality of voltage-frequency levels,
    wherein the DVFS controller is further configured to select one of the plurality of voltage-frequency levels in response to the control signal generated by the instruction complexity calculation circuit.

8. The integrated circuit of claim 1, further comprising:
    a temperature management circuit configured to measure a temperature of the integrated circuit,
    wherein the instruction complexity calculation circuit is further configured to calculate the instruction complexity if the temperature of the integrated circuit exceeds a first reference temperature.

9. The integrated circuit of claim 8, wherein the DVFS controller is further configured to adjust the first voltage-frequency level to reduce the temperature of the integrated circuit if the temperature of the integrated circuit exceeds a second reference temperature higher than the first reference temperature.

10. An operating method for an integrated circuit including a core, the operating method comprising:
    processing instructions, using the core, in accordance with a first voltage-frequency level during an earlier interval before a reference time;
    calculating an instruction complexity for at least one instruction to-be-processed by the core during a later interval after the reference time in relation to heating information associated with the integrated circuit and acquired before the reference time;
    adjusting the first voltage-frequency level to a second voltage-frequency level after the reference time in response to the instruction complexity; and
    processing the at least one instruction in accordance with the second voltage-frequency level after the reference time,
    wherein calculating the instruction complexity comprises
        identifying at least one operation code corresponding to the at least one instruction,
        counting, from the at least one operation code, a first number of operation codes associated with a first complexity value and a second number of operation codes associated with a second complexity value, and
        determining the instruction complexity based on the first number and the second number.

11. The operating method of claim 10, wherein the heating information includes at least a temperature increment for the integrated circuit and a utilization increment for the integrated circuit,
    the calculating of the instruction complexity includes summing a first product of the temperature increment and a first weight with a second product of the utilization increment and a second weight, and
    each one of the temperature increment and the utilization increment is determined in relation to operation of the integrated circuit before the reference time.

12. The operating method of claim 11, wherein the heating information further includes an operating frequency increment for the integrated circuit and an operating voltage increment for the integrated circuit, and
   at least one of the temperature increment, the utilization increment, the operating frequency increment, and the operating voltage increment is determined before the reference time using machine learning.

13. The operating method of claim 10, wherein the instructions processed in accordance with the first voltage-frequency level before the reference time have a first complexity greater than a second complexity of the at least one instruction, and
   the first voltage-frequency level is lower than the second voltage-frequency level.

14. The operating method of claim 10, wherein the calculating of the instruction complexity is performed in response to a temperature of the integrated circuit exceeding a first reference temperature.

15. The operating method of claim 14, wherein the adjusting of the first voltage-frequency level to a second voltage-frequency level reduces the temperature of the integrated circuit below a second reference temperature higher than the first reference temperature.

16. An integrated circuit performing a dynamic voltage and frequency scaling (DVFS) operation, the integrated circuit comprising:
   a core configured to execute first instructions in accordance with a source voltage received by the core and a clock signal received by the core during an earlier interval before a reference time;
   a temperature management circuit configured to measure a temperature of the integrated circuit;
   an instruction complexity calculation circuit configured to calculate an instruction complexity for at least one second instruction to-be-processed during a later interval after the reference time, wherein the instruction complexity is calculated in relation to a temperature increment of the integrated circuit associated with execution of the first instructions, and the instruction complexity calculation circuit is further configured to generate a control signal corresponding to the instruction complexity;
   a dynamic voltage and frequency scaling (DVFS) controller configured to generate at least one of a voltage control signal and a frequency control signal in response to the control signal;
   a power management circuit configured to adjust an amplitude of the source voltage in response to the voltage control signal; and
   a clock management circuit configured to adjust a frequency of the clock signal in response to the frequency control signal,
   wherein, to calculate the instruction complexity, the instruction complexity calculation circuit is configured to
      identify at least one operation code corresponding to the at least one instruction,
      count, from the at least one operation code, a first number of operation codes associated with a first complexity value and a second number of operation codes associated with a second complexity value, and
      determine the instruction complexity based on the first number and the second number.

17. The integrated circuit of claim 16, wherein the control signal is a first control signal when the temperature increment is relatively large, and
   the control signal is a second control signal different from the first control signal when the temperature increment is relatively small.

18. The integrated circuit of claim 17, wherein the DVFS controller is further configured to generate a first voltage control signal and a first frequency control signal associated with a first voltage-frequency level in response to the first control signal, and generate a second voltage control signal and a second frequency control signal associated with a second voltage-frequency level different from the first voltage-frequency level in response to the second control signal, and
   the first voltage-frequency level is lower than the second voltage-frequency level.

19. The integrated circuit of claim 16, wherein the instruction complexity calculation circuit is further configured to calculate the instruction complexity when the temperature of the integrated circuit exceeds a reference temperature, and
   a time when the temperature of the integrated circuit exceeds the reference temperature is the reference time.

* * * * *